United States Patent [19]

Kröckert et al.

[11] Patent Number: 5,049,193
[45] Date of Patent: Sep. 17, 1991

[54] HEAT STABLE IRON OXIDE PIGMENTS OF UPSILON-$Fe_2O_3$ STRUCTURE, A PROCESS FOR THEIR PRODUCTION AND THEIR USE

[75] Inventors: Bernd Kröckert, Wesel; Gunter Buxbaum; Axel Westerhaus, both of Krefeld; Horst Brunn, Meerbusch-Lang, all of Fed. Rep. of Germany

[73] Assignee: Bayer Aktiengesellschaft, Leverkusen, Fed. Rep. of Germany

[21] Appl. No.: 608,587

[22] Filed: Oct. 29, 1990

Related U.S. Application Data

[63] Continuation of Ser. No. 359,318, May 31, 1989, abandoned.

[30] Foreign Application Priority Data

Jun. 16, 1988 [DE] Fed. Rep. of Germany ......... 320499

[51] Int. Cl.$^5$ ............... C09C 1/22; C09C 1/28; C09C 1/40
[52] U.S. Cl. .................... 106/456; 106/457; 106/459; 106/481; 106/483; 501/126; 501/128
[58] Field of Search .............. 501/126, 128; 106/456, 106/457, 459, 481, 483

[56] References Cited

U.S. PATENT DOCUMENTS

| | | | |
|---|---|---|---|
| 4,349,385 | 9/1982 | Huisman et al. | 106/37 |
| 4,491,619 | 1/1985 | Biermann et al. | 106/456 |
| 4,631,089 | 12/1986 | Rademachers et al. | 106/456 |

FOREIGN PATENT DOCUMENTS

| | | | |
|---|---|---|---|
| 0054749 | 3/1967 | Fed. Rep. of Germany | 106/457 |
| 2449711 | 2/1980 | France . | |
| 0002748 | 1/1982 | Japan | 106/457 |
| 0299497 | 3/1971 | U.S.S.R. | 106/457 |
| 1126549 | 11/1984 | U.S.S.R. | 106/457 |

OTHER PUBLICATIONS

Golov et al., Patent SU1033517 Abstract only.
Influence of Certain Cations on the Physicochemical and pigment properties of γ-Ferric Oxide T. V. Kallinskaya, The Jorunal of Applied Chemistry of the U.S.S.R. pp. 2499–2501.

Primary Examiner—Paul Lieberman
Assistant Examiner—John Boyd
Attorney, Agent, or Firm—Sprung Horn Kramer & Woods

[57] ABSTRACT

A pigment useful for coloring building materials such as bricks is a heat-stable isometric iron oxide brown pigment of γ-$Fe_2O_3$ structure which has a silicon content, expressed as $SiO_2$, of 0.1 to 12% and an Al content, expressed as $Al_2O_3$, of 0.02 to 5%.

15 Claims, 1 Drawing Sheet

HEAT STABLE IRON OXIDE PIGMENTS OF UPSILON-FE₂O₃ STRUCTURE, A PROCESS FOR THEIR PRODUCTION AND THEIR USE

This application is a continuation of application Ser. No. 359,318, filed May 31, 1989 now abandoned.

This invention relates to heat-stable, isometric iron oxide brown pigments of $\gamma$-$Fe_2O_3$ structure characterized by high thermal stability, to a process for their production and to their use.

BACKGROUND OF THE INVENTION

Synthetic, commercially available brown pigments are largely obtained by mixing yellow, red and/or black iron oxide pigments (Ullmanns Encyklopädie der technischen Chemie, 4th revised and extended Edition, Vol. 18, Anorganische Pigmente (Inorganic Pigments), 1979, page 603). The presence of iron oxide yellow and/or black makes the products thermally unstable, which limits their range of application. The presence of hematite in the brown pigments in their lightened form, for example in admixture with $TiO_2$, results in an unwanted, violet hue, which further restricts their range of applications.

The incorporation of manganese in the $\alpha$-$Fe_2O_3$ lattice (U.S. Pat. No. 3,276,894 and DE-A 881 562) gives temperature-stable brown pigments, although the violet hue remains intact in the lightened form.

Although the production of iron/aluminium mixed oxides in accordance with DE-A 3 324 400 leads to brown pigments having good properties, the mixed precipitates obtained are difficult to filter, which complicates the production process. In addition, the high calcination temperature makes the products grain-hard so that they have to be intensively ground.

$\gamma$-$Fe_2O_3$ has long been known as a magnetic pigment (cf. U.S. Pat. No. 3,082,067). JP-A 61-232 223 describes isometric brown pigments based on $\gamma$-$Fe_2O_3$ with a content of $SiO_2$. In admixture with $TiO_2$, however, these brown pigments show an undesirable red tinge.

Although $\gamma$-FeOOH has been described as pure brown (U.S. Pat. Nos. 3,382,174 and 2,560,970), commercial $\gamma$-FeOOH pigments show a yellow-orange hue. These products decompose to red-brown $\gamma$-$Fe_2O_3$ at temperatures above 200° C. (U.S. Pat. No. 3,082,067) and to red $\alpha$-$Fe_2O_3$ at temperatures above 300° C. (U.S. Pat. No. 3,382,174).

BRIEF DESCRIPTION OF THE INVENTION

The object of the present invention is to provide $\gamma$-$Fe_2O_3$ pigments which do not have any of the described disadvantages. It has now surprisingly been found that brown pigments which are thermally stable up to 650° C. and which do not show a violet tinge in admixture are obtained in the calcination of finely divided $Fe_3O_4$ pigments produced by the aniline process (Winnacker-Küchler, Chemische Technologie, Vol. 3, Anorg. Technologie II, 4th Edition, 1983, page 379, U.S. Pat. Nos. 1,793,941 and 1,793,942) with an $SiO_2$ content of 0.1 to 12% and an $Al_2O_3$ content of 0.02 to 5%.

Accordingly, the present invention relates to a heat-stable, isometric iron oxide brown pigment of $\gamma$-$Fe_2O_3$ structure which has an $SiO_2$ content of 0.1 to 12% and an additional Al content, expressed as $Al_2O_3$, of 0.02 to 5%. These and the following percentages are percentages by weight. The $SiO_2$ content of the pigments according to the invention is preferably from 1 to 10%.

DETAILED DESCRIPTION

Figure 1:
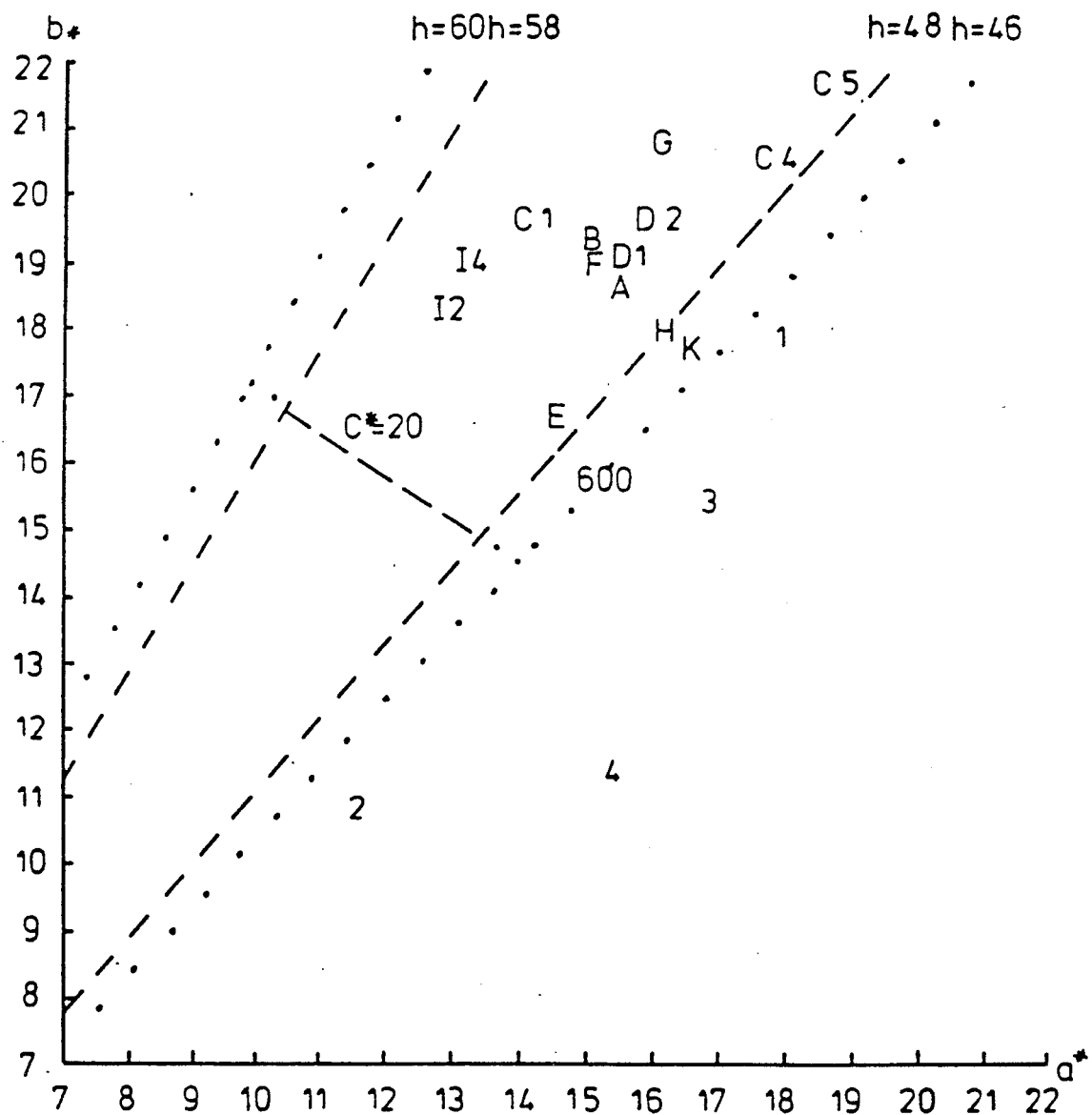
FIG. 1 illustrates the relationship in graft form of the coloristic values a* versus b* for various iron oxide pigments.

The present invention relates to a heat-stable, isometric iron oxide brown pigment which has an $SiO_2$ content of from 0.1 to 12% and additionally an Al content, expressed as $Al_2O_3$ of from 0.02 to 5% by weight. The iron oxide brown pigment of the present invention is produced by calcination of finely divided $Fe_3O_4$ pigments produced by the aniline process with an $SiO_2$ content of from 0.1 to 12% and an $Al_2O_3$ content of 0.02 to 5%. Both the new iron oxide brown pigments and the process by which they are made are a part of the present invention. It has been surprisingly found that the brown pigments of the present invention are thermally stable up to 650° C. and do not show a detrimental violet tinge in admixture with $TiO_2$ pigments.

The products according to the invention are characterized by radiography, by determination of the surface, by quantitative determination of the $SiO_2$ and $Al_2O_3$ contents and by colorimetry. In addition, visual assessment is necessary for evaluation of the mixtures with $TiO_2$ and the samples incorporated in lime-sand bricks. Despite their high production temperature, the pigments of the invention—according to powder diffractometry—have a $\gamma$-$Fe_2O_3$ structure characterized by the development of the superstructure reflexes in accordance with ASTM Card Index No. 25-1402 (at a lattice distance of 3, 4 Å the 213-Reflex with an intensity of 9.7% is found, which is significant for maghemite).

The specific surfaces are determined by the BET one-point nitrogen method. As can be seen from the Examples, the surface of the magnetites used must be larger than 14 $m^2/g$ to obtain a neutral brown pigment after calcination at 400° C.

Accordingly, iron oxide brown pigments according to the invention which have a BET surface of larger than 14 $m^2/g$ and preferably larger than 18 $m^2/g$ are preferred. The $SiO_2$ contents are wet-chemically determined in accordance with DIN 53 913 (equivalent to ISO DIN 1248) while the $Al_2O_3$ contents are determined by the AAS method.

The hues of all the products are determined in Alkydal® F 48 (a product of Bayer AG), a medium-oil alkyd resin, at a pigment volume concentration of 10% in accordance with DIN 6174 (equivalent to ISO DIN 7724, 1-3 drafts). 1 Part pigment and 5 parts $TiO_2$ (R-KB-2 ®, a product of Bayer AG) are used for the preparation of the lightened forms. All the colorismetric values are based on the specified absolute values of the commercial product of Bayer AG, Bayferrox ® 600, which are selected at random from the various tests and, hence, serve only as reference (Table).

For testing in lacquers, the pigments are ground for 7.5 s with a steel ball in a Dismembrator. The hue h of the iron oxide pigments according to the invention is in the range from 46 to 60 and preferably in the range from 48 to 58 and for C*>20. The iron oxide brown pigments according to the invention are resistant to steam under high pressure.

The present invention also relates to a process for the production of the pigments according to the invention.

The process according to the invention is characterized in that $Fe_3O_4$ pigments obtained by the aniline process containing 0.1 to 12% and preferably 1 to 10% silicon compounds, expressed as $SiO_2$, and in addition 0.02 to 5% aluminium compounds, expressed as $Al_2O_3$, are calcined in air or oxygen for 30 minutes to 24 hours and preferably for 1 to 2 hours at temperatures in the range from 200° to 700° C. and preferably at temperatures in the range from 300° to 600° C.

It is best initially to dry the educts at 50° to 100° C. and then to calcine them in chamber furnaces, rotating bulb furnaces or even rotating tube furnaces at temperatures in the range from 200° to 700° C. and preferably at temperatures in the range from 300° to 600° C. Higher temperatures generally lead to reduced saturation values, an optimal value being obtained in dependence upon the precursor so that any further increase in temperature results in a deterioration.

The products are suitable for use in the construction field, in paints and in plastics, depending on the $SiO_2$ and $Al_2O_3$ contents (0.1 to 12% and 0.02 to 5%, respectively). Accordingly, the present invention also relates to the use of the iron oxide brown pigments according to the invention in building materials hardened at high temperature and pressure and to their use in concrete bricks, more especially in admixture with iron oxide red pigments of the same morphology.

The following Examples are intended to illustrate the invention without limiting it in any way.

FIG. 1 shows the products according to the invention from the Examples with their absolute values for a* and b*. The symbols used have the following meanings: A, B, C 1, C 4, C 5, D 1, D 2, E, F, G, H, I 2, I 4, K = products of the Examples; 1, 2, 3, 4 = products of the Comparison Examples and 600 = the commercial product of Bayer AG, Bayferrox ® 600.

| | |
|---|---|
| A = Example 1 | 1 = Comparison Example 1 |
| B = Example 2 | 2 = Comparison Example 2 |
| C1 = Example 3 | 3 = Comparison Example 3 |
| C4 = Example 3 | 4 = Comparison Example 4 |
| C5 = Example 3 | |
| D1 = Example 4 | |
| D2 = Example 4 | 600 = Bayferrox ® 600, a product of Bayer AG |
| E = Example 5 | |
| F = Example 6 | |
| G = Example 7 | |
| H = Example 8 | |
| I2 = Example 9 | |
| I4 = Example 9 | |
| K = Example 10 | |

It was found that, over the range investigated, all the pigments which show a pure-hue color angle of less than 48 are accompanied by the undesirable violet tinge in admixture with $TiO_2$. The pure hue was determined in alkydal ® F 48, a product of Bayer AG.

EXAMPLE 1

An iron oxide black suspension is prepared by the aniline process described in DE-A 2 826 941. To this end, 70 ml $AlCl_3$ solution (160 g/l), 15 ml water, 2 ml 96% $H_2SO_4$, 20 ml nitrobenzene and 20 g ground iron turnings containing 1.54% Si and 0.02% Al are added to 130 ml of an $FeCl_2$ solution 360 g/l). After the mixture has been heated to 90° C., 135 ml nitrobenzene are run in over a period of 2 hours. After reduction of the nitrobenzene, most of the aniline is decanted off and the residues remaining in the iron oxide suspension are driven out with steam. After the residual salts have been washed out with water, the iron oxide suspension remaining is filtered and, finally, is dried at 100° C. The product contains 2.4% by weight $SiO_2$ and 0.03% by weight $Al_2O_3$ for a surface of 24 m²/g. After heating to 400° C. in a rotating bulb furnace, the material is calcined for 1 hour at that temperature. A brown powder is obtained which, in colorimetric tests, produces an angle h of 50 for the pure hue, shows a neutral-brown hue in admixture with $TiO_2$ and has a surface of 23 m²/g.

EXAMPLE 2

50 ml of an aluminium salt solution (1.3% by weight, based on $Fe_3O_4$) are added over a period of 60 minutes with stirring at 80° C. to the iron oxide suspension of Example 1 (290 g Fe/l) with an $FeCl_2$ content of 66 g, corresponding to 45 g Fe/l, followed by pH adjustment from an initial value of approximately 3.7 to a final value of 5.5 over a period of 60 minutes by addition of 10% sodium hydroxide. After the residual salts have been washed out with water, the $Fe_3O_4$ is filtered off and dried at 100° C. An educt having a surface of 36 m²/g, an $SiO_2$ content of 2.6% by weight and an $Al_2O_3$ content of 1.3% by weight is obtained. It is introduced into a rotating bulb furnace heated to 400° C. and calcined for 1 hour. The pigment obtained with a surface of 33 m²/g is pure brown both in its pure hue and in its lightened form.

EXAMPLE 3

The magnetite samples of Example 2 dried at 100° C. are calcined in air for 1 hour at 400° C., 500° C., 600° C., 625° C. and 650° C. in a chamber furnace. All the products are neutral brown pigments both in pure hue and in lightened form.

EXAMPLE 4

An isometric magnetite prepared in accordance with Example 1, but with an $SiO_2$ content of 2.3% by weight, an $Al_2O_3$ content of 0.27% by weight and a surface of 21 m²/g is calcined at 400° C. and 500° C. in a chamber furnace. The pigments obtained with a surface of 22 m²/g are pleasantly neutral brown both in pure hue and in lightened form.

EXAMPLE 5

The magnetite prepared in accordance with Example 4 is aftertreated with 10% $SiO_2$. To this end, an $Fe_3O_4$ suspension is adjusted to pH 9 by addition of 150 g/l NaOH, after which the necessary quantity of Na waterglass is adjusted to pH 7 with $H_2SO_4$ over a period of 2 hours. After filtration and drying at 60° C., a product having a surface of 19 m²/g, an $SiO_2$ content of 9.6% by weight and an $Al_2O_3$ content of 0.3% by weight is obtained. Calcination in a chamber furnace at 400° C. gives a pure brown pigment with a surface of 23 m²/g.

EXAMPLE 6

The isometric magnetite of Example 4 is aftertreated with 6% by weight $SiO_2$ and 4% by weight $Al_2O_3$. To this end, an $Fe_3O_4$ suspension is adjusted to pH 9 with 150 g/l NaOH, after which the necessary quantity of Na waterglass is added over a period of 2 hours. After heating to 90° C., the pH is adjusted to pH with $H_2SO_4$ over a period of 2 h and then rapidly to pH 3. A mixture of Na aluminate, expressed as 4% by weight $Al_2O_3$, based on 150 g/l Fe₃O₄, and H₂OSO₄ is then added over a period of 30 minutes at a constant pH value. Finally, the pH is adjusted to 7 with NaOH, followed after filtration by drying at 60° C. The aftertreated product has a surface of 31 m$^2$/g, an SiO$_2$ content of 5.1% by weight and an Al$_2$O$_3$ content of 3.2% by weight. The product obtained after calcination for 1 h at 400° C. in a chamber furnace has a surface of 23 m$^2$/g and is neutral deer-brown both in its pure hue and in its lightend form.

EXAMPLE 7

After calcination for 1 hour at 400° C. in a chamber furnace, a magnetite obtained by the aniline process as in Example 2, but with a surface of 32 m$^2$/g contains 1.4% by weight SiO$_2$ and 2.7% by weight Al$_2$O$_3$. A good neutral brown pigment is obtained with a surface of 27 m$^2$/g.

EXAMPLE 8

An isometric magnetite prepared as in Example 1, but with a content of 2.5% by weight SiO$_2$ and 0.03% by weight Al$_2$O$_3$ and with a surface of 18 m$^2$/g, is calcined for 1 hour at 400° C. in a chamber furnace. The product obtained with a surface of 19 m$^2$/g is neutral brown in its pure hue.

EXAMPLE 9

Samples of the magnetite of Example 2 are first heated and calcined for 30 minutes, 1 hour, 2 hours and 24 hours at 400° C. in a rotating bulb furnace. All the pigments are neutral deer-brown both in pure hue and in lightened form.

EXAMPLE 10

A magnetite prepared as in Example 1, but with an SiO$_2$ content of 2.5% by weight, an Al$_2$O$_3$ content of 0.02% by weight and a surface of 14.5 m$^2$/g is calcined for 1 hour in a chamber furnace. The product obtained with a surface of 14 m$^2$/g is neutral brown in its pure hue. However, visual examination of the lightened form shows that it is tinged with violet.

EXAMPLE 11

The pigment of Example 1 was incorporated in lime-sand bricks in quantities of 0.2 to 1%. In all samples, the neutral brown hue remains intact for 4 hours under a steam pressure of 16 bar and for 8 hours under a steam pressure of 8 bar.

EXAMPLE 12

1.2% by weight of the product of Example 1 and mixtures of the products of Examples 1 and 10 with the red iron oxide pigments Bayferrox ® 110 and 130 (products of Bayer AG) in quantities of 1.2% by weight are mixed in ratios of 1:1, 1:2 and 1:3 in a concrete mixture of 240 g quartz sand (0.2–1 mm), 120 g quartz sand (1–2 mm), 40 g quartz powder, 100 g white cement and 35 g water. After another 35 g water have been added, the mixtures are pressed for 10 seconds at 400 bar in a steel mold, subsequently hardened for 24 hours at 35° C./100% air humidity and then hardened in air for another 24 hours. A neutral brown concrete brick and, in the case of the red mixtures, brick-red bricks are obtained.

COMPARISON EXAMPLE 1

After calcination for 1 hour at 400° C. in a chamber furnace, a magnetite prepared in accordance with Example 1, but with an SiO$_2$ content of less than 0.1% by weight, an Al$_2$O$_3$ content of less than 0.02% by weight and a surface of 18 m$^2$/g, is not a neutral brown pigment either in pure hue or in lightened form and has a surface of 19 m$^2$/g.

COMPARISON EXAMPLE 2

Magnetite obtained as in Example 1 by the aniline process with an SiO$_2$ content of less than 0.1% by weight, an Al$_2$O$_3$ content of 0.43% by weight and a surface of 4 m$^2$/g is calcined for 1 hour at 400° C. in a chamber furnace. The product with a surface of 4 m$^2$/g is red-brown and, in admixture with TiO$_2$, violet.

COMPARISON EXAMPLE 3

The yellow-orange commercial product of Bayer AG, Bayferrox ® 943, which has a γ-FeOOH structure is calcined for 1 hour at 400° C. in a chamber furnace. The product formed is red-brown.

COMPARISON EXAMPLE 4

A magnetite having a surface of 7.4 m$^2$/g, an apparent density of 0.92 g/cm$^3$ and an SiO$_2$ content of 2.2% by weight fulfils the specification according to JP-A-61-23 22 33. Calcination for 1 hour at 350° C. gives a red-brown pigment with a surface of 7 m$^2$/g; the TiO$_2$-lightened form is violet.

| Reference | L* | a* | b* | C* | h |
|---|---|---|---|---|---|
| Bayferrox ® 600 | 37.0 | 15.7 | 15.3 | 21.9 | 44.3 |
| Example 1, A | 37.7 | 15.5 | 18.8 | 24.4 | 50.5 |
| Example 2, B | 38.1 | 15.1 | 19.3 | 24.5 | 51.0 |
| Example 3, | | | | | |
| C 1/400° C. | 38.7 | 14.2 | 19.6 | 24.2 | 54.2 |
| C 2/500° C. | 39.0 | 13.9 | 20.1 | 24.8 | 54.3 |
| C 3/600° C. | 39.4 | 13.5 | 20.7 | 25.5 | 54.3 |
| C 4/625° C. | 39.6 | 18.0 | 20.5 | 28.6 | 49.9 |
| C 5/650° C. | 39.6 | 19.0 | 21.5 | 28.7 | 48.5 |
| Example 4, | | | | | |
| D 1/400° C. | 37.6 | 15.6 | 19.0 | 24.5 | 50.7 |
| D 2/500° C. | 38.0 | 16.0 | 19.5 | 25.2 | 50.7 |
| Example 5, E | 36.1 | 14.6 | 16.7 | 22.1 | 48.9 |
| Example 6, F | 37.6 | 15.2 | 19.0 | 24.3 | 51.3 |
| Example 7, G | 39.0 | 16.2 | 20.7 | 26.3 | 51.9 |
| Example 8, H | 37.1 | 16.2 | 18.0 | 24.2 | 48.0 |
| Example 9, | | | | | |
| I 1/30 mins | 38.1 | 13.0 | 18.2 | 22.3 | 54.4 |
| I 2/1 h | 38.1 | 13.0 | 18.3 | 22.4 | 54.6 |
| I 3/2 h | 38.4 | 12.9 | 18.6 | 22.6 | 55.2 |
| I 4/24 h | 38.7 | 13.3 | 19.0 | 23.3 | 55.0 |
| Example 10, K | 36.7 | 16.6 | 17.7 | 24.2 | 46.9 |
| Comp. Example 1, 1 | 37.0 | 18.0 | 17.9 | 28.4 | 44.9 |
| Comp. Example 2, 2 | 32.7 | 11.6 | 10.8 | 15.8 | 43.1 |
| Comp. Example 3, 3 | 35.0 | 16.9 | 15.4 | 22.7 | 42.0 |
| Comp. Example 4, 4 | 32.3 | 15.4 | 11.3 | 19.1 | 36.4 |

What is claimed is:

1. A heat-stable isometric iron oxide brown pigment of γ-Fe$_2$O$_3$ structure consisting essentially of γ-Fe$_2$O$_3$ having a silicon content, expressed as SiO$_2$, of 0.1 to 12 weight % and an Al content, expressed as Al$_2$O$_3$, of 0.02 to 5%, the pigment being thermally stable up to 650° C.

2. A heat-stable iron oxide brown pigment as claimed in claim 1 wherein the SiO$_2$ content is from 1 to 10 weight %.

3. A heat-stable iron oxide brown pigment as claimed in claim 1 which has a BET surface of larger than 14 m²/g.

4. A heat-stable iron oxide brown pigment as claimed in claim 3 which has a BET surface of larger than 18 m²/g.

5. A heat-stable iron oxide brown pigment as claimed in claim 1 wherein the hue h is in the range from 46 to 60 and for $C^* > 20$.

6. A heat-stable iron oxide brown pigment as claimed in claim 5 wherein the hue h is in the range from 48 to 58.

7. A heat-stable iron oxide brown pigment as claimed in claim 1 which is resistant to steam under high pressure.

8. A process for the production of the heat-stable iron oxide brown pigment claimed in claim 1 wherein $Fe_3O_4$ pigments obtained by the aniline process containing 0.1 to 12 weight % silicon compounds, expressed as $SiO_2$, and 0.02 to 5 weight % aluminum compounds, expressed as $Al_2O_3$, are calcined in air or oxygen for 30 minutes to 24 hours at temperatures in the range from 200° to 700° C.

9. A process according to claim 8 wherein calcination is at temperatures in the range of 300° to 600° C.

10. A process according to claim 8 wherein calcination is for a time of 1 to 2 hours.

11. A process according to claim 8 wherein calcination is preceded by drying at 50° to 100° C.

12. Colored building materials which are hardened at high temperature and pressure which contain the iron oxide brown pigment as claimed in claim 1 as a coloring agent.

13. Concrete bricks colored with a coloring agent which comprises the iron oxide brown pigment according to claim 1.

14. Concrete bricks as claimed in claim 13 which additionally comprises as a coloring agent iron oxide red pigment of the same morphology as said brown pigment.

15. A heat-stable iron oxide brown pigment as claimed in claim 1, wherein said pigment does not show a violet tinge in admixture with $TiO_2$ pigments.

* * * * *

UNITED STATES PATENT AND TRADEMARK OFFICE
CERTIFICATE OF CORRECTION

PATENT NO. : 5,049,193

DATED : September 17, 1991

INVENTOR(S) : Krockert et al.

It is certified that error appears in the above-identified patent and that said Letters Patent is hereby corrected as shown below:

Title Page      [30] Foreign Application Priority Data: Delete " 320499 " and substitute -- 3820499 --

Col. 7, line 20      Delete " containing " and substitute -- consisting essentially of --

Signed and Sealed this

Fourth Day of January, 1994

Attest:

BRUCE LEHMAN

Attesting Officer      Commissioner of Patents and Trademarks